Dec. 3, 1963
C. F. CARLTON
3,112,504
WATER SHOES
Filed Oct. 20, 1961
3 Sheets-Sheet 1
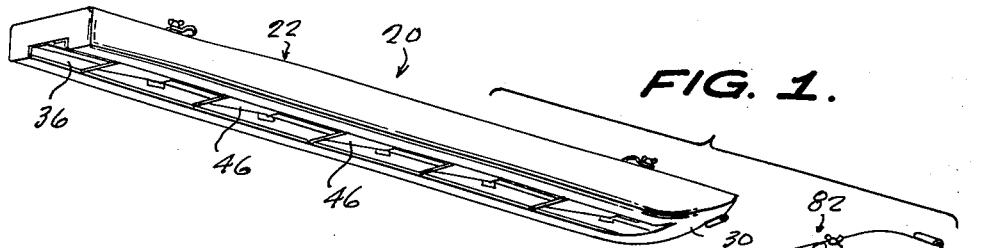
FIG. 1.
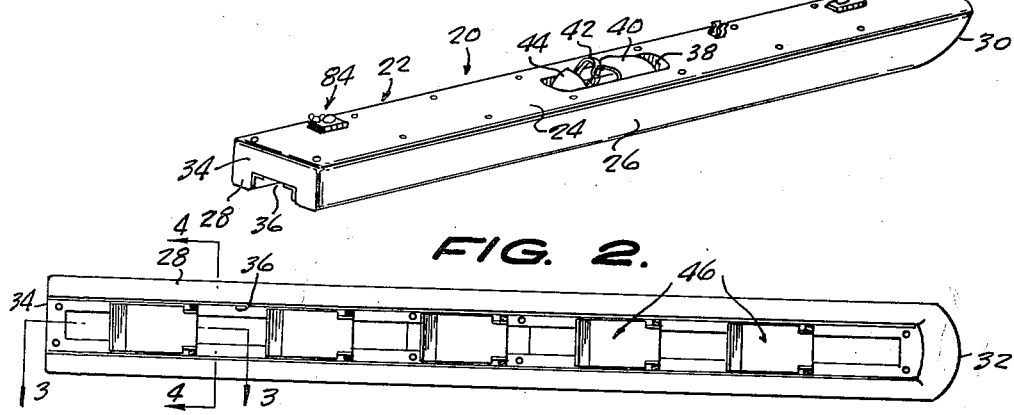
FIG. 2.
FIG. 3
FIG. 4.
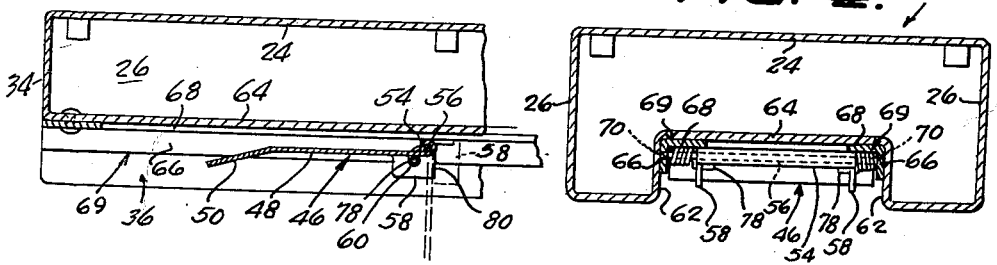
FIG. 5.
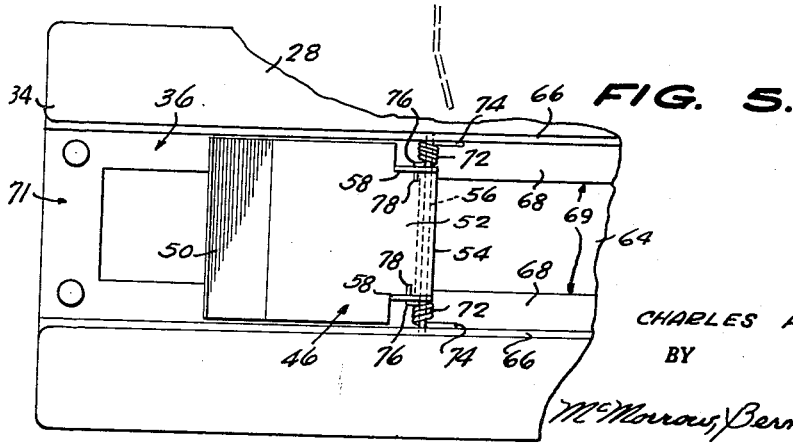
INVENTOR.
CHARLES F. CARLTON,
BY
McMorrow, Berman + Davidson
ATTORNEYS.

Dec. 3, 1963   C. F. CARLTON   3,112,504
WATER SHOES
Filed Oct. 20, 1961   3 Sheets-Sheet 2
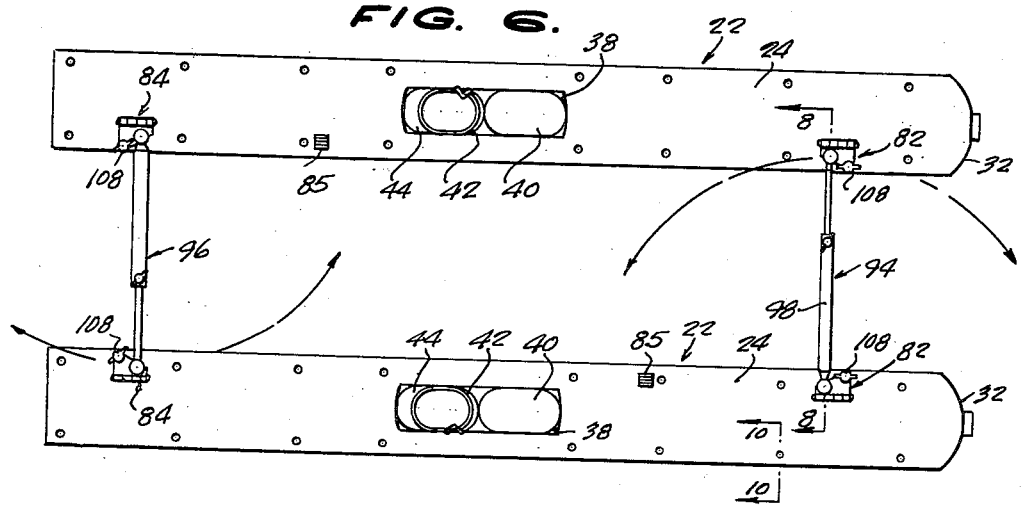
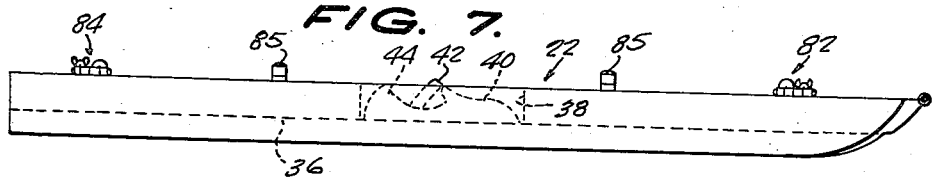
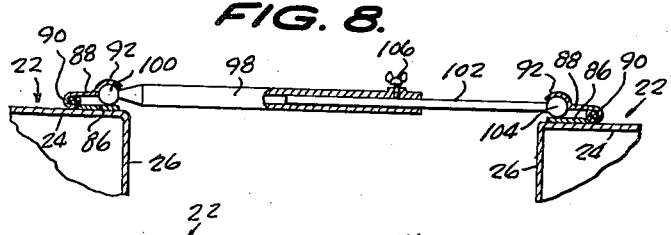
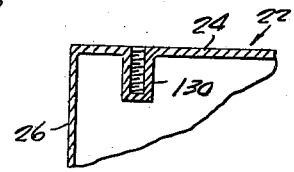
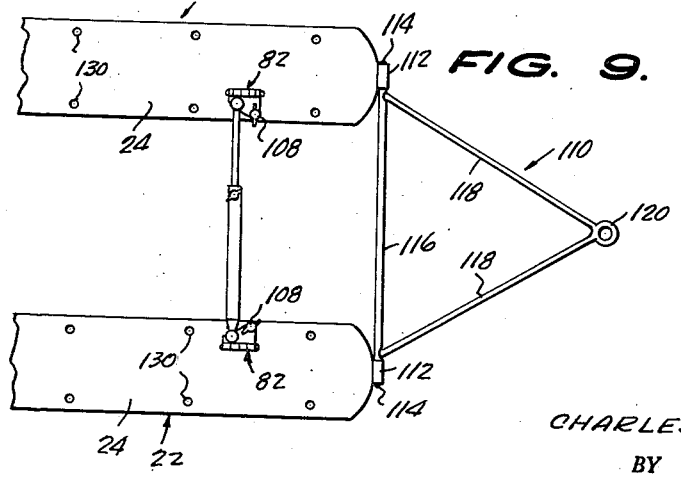
INVENTOR.
CHARLES F. CARLTON,
BY
McMorrow, Berman & Davidson
ATTORNEYS.

Dec. 3, 1963   C. F. CARLTON   3,112,504
WATER SHOES
Filed Oct. 20, 1961
3 Sheets-Sheet 3

INVENTOR.
CHARLES F. CARLTON,
BY
McMorrow, Berman + Davidson
ATTORNEYS.

United States Patent Office 3,112,504
Patented Dec. 3, 1963

3,112,504
WATER SHOES
Charles F. Carlton, 105 Old Pond Road, Natchez, Miss.
Filed Oct. 20, 1961, Ser. No. 146,596
3 Claims. (Cl. 9—310)

This invention relates to novel water shoes adapted for pleasure water walking and for traversing marshes in the course of work.

The primary object of the invention is the provision of more practical and efficient water shoes of the kind indicated, which comprise elongated buoyant bodies having longitudinal channels in their undersides, within which are positioned longitudinally spaced propulsion vanes which are yieldably spring-biased from pendant propelling positions to elevated glide positions, whereby lateral drift of the shoes in water is resisted in either position of the vanes, and the vanes do not extend below the shoes bodies, in the glide position thereof, to snag in objects in the water, such as vegetation and mud or sand.

Another object of the invention is the provision of water shoes of the character indicated above, which are equipped with means for holding the shoes in parallel spaced coextensive relationship, for towing or for being driven by a motor operated propeller, and equipped, in the latter case, with seat means extending between the shoes.

Other important objects and advantageous features of the invention will be apparent from the following description and the accompanying drawings, wherein, for purposes of illustration only, a specific form of the invention is set forth in detail.

In the drawings:

FIGURE 1 is a group perspective view of a pair of water shoes of the present invention;

FIGURE 2 is a bottom plan view of a water shoe;

FIGURE 3 is an enlarged fragmentary vertical longitudinal section taken on the line 3—3 of FIGURE 2, and showing a vane in retracted glide position, in full lines, and in pendant propelling position, in phantom lines;

FIGURE 4 is a transverse vertical section taken on the line 4—4 of FIGURE 3;

FIGURE 5 is an enlarged fragmentary bottom plan view of a water shoe, showing a vane in retracted glide position;

FIGURE 6 is a top plan view showing a pair of water shoes connected together to be moved relative to each other in opposite directions in parallel paths;

FIGURE 7 is a side elevation of a water shoe with its vanes retracted;

FIGURE 8 is an enlarged fragmentary vertical transverse section taken on the line 8—8 of FIGURE 6;

FIGURE 9 is a fragmentary top plan view, like FIGURE 6, showing a tow device secured to the forward ends of the shoes;

FIGURE 10 is a transverse vertical section taken on the line 10—10 of FIGURE 6;

Figure 11:
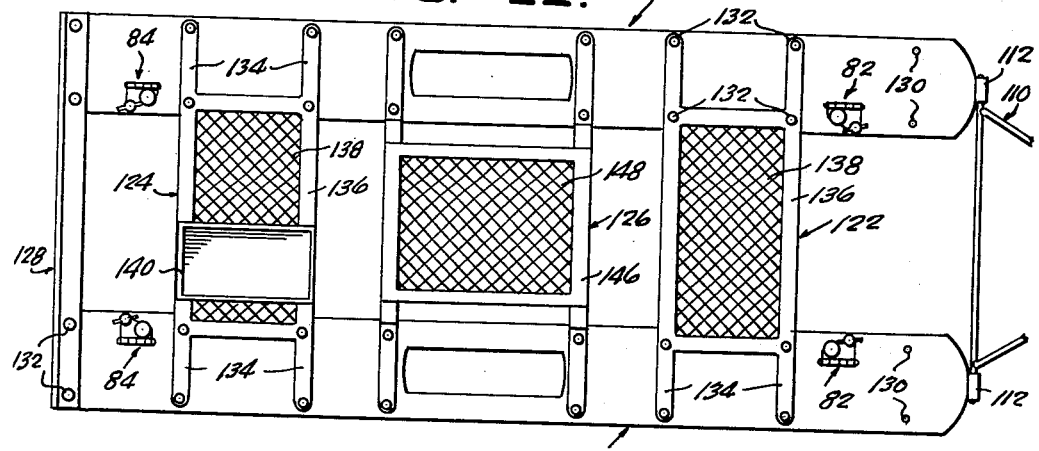
FIGURE 11 is a top plan view, like FIGURE 10, showing load bearing cross members secured to and extending between the shoes, and a motor mount at and extending between the rear ends of the shoes.
Figure 12:
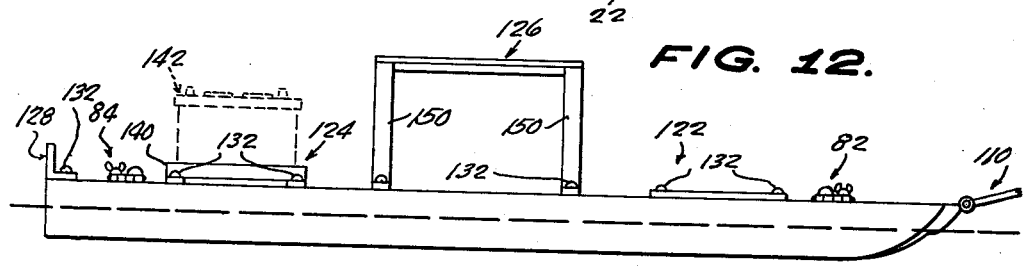
FIGURE 12 is a side elevation of FIGURE 11, showing a motor operating battery, in phantom lines, supported on a part of said seat means.
Figure 13:
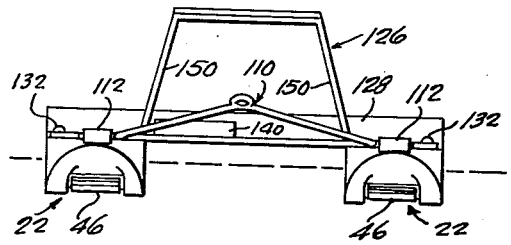
FIGURE 13 is a front end elevation of FIGURE 11.
Figure 14:
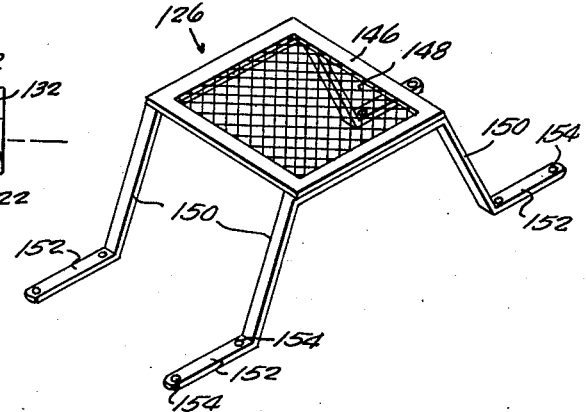
FIGURE 14 is a perspective view of a cross member in the front of the seat.
Figure 15:
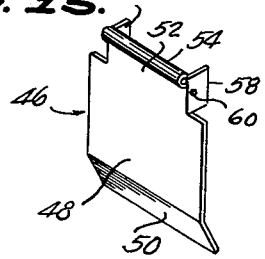
FIGURE 15 is a perspective view of a vane, per se.

Referring in detail to the drawings, wherein like numerals designate like parts throughout the several views, and first to FIGURES 1 through 5, each water shoe, generally designated 20, comprises a longitudinally elongated substantially rectangular cross section hollow buoyant float 22 having a flat top wall 24, parallel side walls 26, and a flat bottom wall 28, which is parallel to the top wall 24. The bottom wall 28 has an upwardly curved forward end portion 30 which extends to the transversely rounded forward end 32 of the float. The float 22 has a squared rear end 34. The bottom wall 28 is indented by a single relatively wide parallel sided longitudinal centered channel 36, which extends the full length of and opens to the ends of the float. The top wall 24 has, intermediate its ends, a longitudinal indentation, defining a foot-receiving recess 38, which contains a rearwardly opening toe-receiving boot 40, a transverse foot-embracing strap 42, behind the boot, and a heel-receiving boot 44 behind the strap.

A single row of propelling vanes 46 is positioned within the channel 36, and is spaced, at its ends, from the ends of the float 22. The vanes 46 are spaced from each other at uniform intervals, at distances substantially the same as the length of a vane. Each vane 46 comprises a flat rectangular rigid rectangular plate 48 having, on its rear or lower end, a free end portion 50 which is bent downwardly out of the plane of the plate 48 at an acute angle of about 30°. A centered extension 52, narrower than the plate 48, is centered relative to and extends forwardly from the plate, and terminates in an upstanding, transverse hinge pin barrel 54, through which a hinge pin 56 extends. Pendant stop flanges 58 are on the side edges of the extension 52 and have detent holes 60, centered therein, at the underside of the extension.

The side walls 62 and the wall 64 of the channel 36 have suitably fixed thereto the arms 66 and 68, respectively, of angle brackets 69, the ends of the hinge pin 56 being journaled in the arms 66, as indicated at 70 in FIGURE 4. Coil springs 72 are circumposed on the hinge pin 56, between the side edges of the extension 52 and the bracket arms 66, and have forwardly extending ends 74 which bear against the channel top wall 64 and the side walls 62 thereof, and removably extending ends 76 which have laterally inwardly extending terminals 78 which are engaged through the stop flange holes 60, whereby the vane 46 is biased upwardly to horizontal retracted glide position, as shown in full lines in FIGURES 3 and 4. The vane 46 is prevented from being swung, in its pendant propelling position, beyond right angles to the float 22, by engagement of the forward edges 80 of the stop flanges 58 with the bracket flanges 68, as indicated in phantom lines in FIGURE 3. As indicated in FIGURES 3 and 5, the brackets 69 preferably extend substantially the full length of the channel 36, and can be open rectangular frames 71, for reinforcing the float 22.

Mounted fixedly upon the float top wall 64, adjacent to its forward and rear ends, and positioned at the inboard sides of the floats 22 are similar forward and rear, ball-socket clamps 82 and 84, respectively, each of which comprises a fixed leaf 86 suitably secured upon the upper surface of the float top wall 24, and an upwardly swingable leaf 88 which is hinged, at its laterally inward edge, as indicated at 90, to the laterally inward edge of the fixed leaf 86. The swingable leaf 88 is formed with a downwardly opening socket 92, for receiving a ball joint on the related end of a coupling rod.

Similar but reversed forward and rear coupling rods 94 and 96 are provided, to extend between the forward and rear ball-socket clamps 82 and 84, respectively. Each coupling rod comprises an elongated tubular section 98 having a ball joint 100, on its outer end, a rod section 102 slidably engaged in the tubular section and having a ball joint 104 on its outer end, and a locking set screw 106 threaded through the sidewall of the tubular section, for locking the sections together in adjusted parallel relationship. As shown in FIGURE 6, the tubular section ball joint 100 is clamped in the forward clamp 82 of the right hand float and the ball joint 104 of the rod section in the forward clamp 82 of the left-hand float, and the rod coupling and ball joints are reversely clamped in the rear clamps 84. When the coupling rods are not in use they can be disengaged, at one end, from the clamps and positioned along the top walls 24 of the floats and releasably secured in upstanding U-clamps 85, on the top walls.

The clamps 82 and 84 are provided with wing bolts 108 which extend through an outer corner of the triangular swingable leaves and are threaded through the fixed leaves. Where, as in the arrangement of FIGURE 6, the floats 22 are to be alternately "walked" forwardly and rearwardly by the user, the ball joints are lightly clamped in the clamps so as to be free to turn therein, as the coupling rods assume the different angular relationships to the floats, involved in alternate "walking" of the floats.

In the catamaran arrangement of FIGURE 9 of the floats 22 the floats 22 are fixed in parallel spaced and coextensive relationship, wherein the ball joints are fully clamped in the clamps 82 and 84, and an isosceles triangular tow member 110 is fixed to the forward ends of the shoes to pivot on a transverse horizontal axis. Sleeves 112 are fixed to the forward ends of the floats, which receive the free ends 114 of the transverse rod 116 of the tow member, from which forwardly converging side members 118 extend, and meet at an apex formed as an eye 120, to which a tow rope or cable (not shown), is adapted to be secured.

As shown in FIGURES 11 through 14, another catamaran arrangement of the floats 22 dispenses with the use of the forward and rear coupling rods 94 and 96, and substitutes fixed cross members, which include a forward platform plate 122, a similar rear platform plate 124, an elevated seat plate 126, positioned between the forward and rear plates, and a rear transverse motor mounting bar 128. As shown in FIGURES 10 and 11, the top walls 24 of the floats 22 are provided with upwardly opening threated sockets 130, spaced in parallel longitudinal rows along the side edges of the top walls, which receive screws 132 for attaching the cross member.

The forward and rear platform plates 122 and 124 are transversely elongated and overlie the floats 22, at their ends, and have pairs of parallel spaced arms 134, on their ends, through which the screws 132 are threaded into related sockets 130, the plates 122 and 124 being located between and spaced from the forward and rear clamps 82 and 84. These platform plates are in the form of open rectangular frames 136, across which non-slip mesh screens 138 are stretched. The rear platform plate 124 has an electric battery supporting pan 140 mounted thereupon adjacent to one of the floats 22, for accommodating an energizing battery 142, for a propeller motor (not shown) mounted on the mounting bar 128, between the floats. The mounting bar 128 is of angle iron form with its horizontal flange 144 secured upon the top walls 24 of the floats, at the rear ends thereof, by means of screws 132 extended therethrough and threaded into the rearmost sockets 130. A tow member 110, like that of FIGURE 9, can be installed on the forward ends of the floats 22, when the motor is not used.

The seat platform plate 126 is preferably in the form of an open rectangular frame 146, across which a mesh screen 148 is stretched, the side members of the frame 146 having pairs of parallel spaced downwardly and laterally outwardly angled bars 150 thereon, which terminate in horizontal feet 152, which bear upon the top walls of the floats and are secured in place by means of screws 132, extending through openings 154, provided in the feet 152, and threaded into related sockets 130.

It will be seen from the foregoing that the invention comprehends vane-equipped floats which can be used, unconnected with each other, as a pair of free water-walking shoes, connected to each other in parallel relationship for independent forward and rear "walking" movements, and rigidly connected together in parallel relationship, as a standup catamaran or as a sit-down catamaran, to be towed, or to be motor driven, the conversions from one form to another being easy, quick, and simple.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:
1. In a device of the character described, a pair of parallel laterally spaced elongated floats having forward and rear ends, the floats being formed with centered longitudinal channels in their undersides extending to said ends, longitudinally spaced vanes pivoted in the channels to swing from horizontal retracted glide positions within the channels to pendant propelling positions extending below the floats, said floats having upper surfaces, forward and rear socket clamps mounted on said upper surfaces adjacent to said forward and rear ends, said clamps having facing ball sockets, and coupling bars extending between the floats and having ball joints on their ends clamped in the ball sockets, said floats having transverse sleeves on their forward ends, and a tow member having a transverse bar having ends journaled in said sleeves.

2. The device according to claim 1 which includes in addition a forward and rear platform plate between said coupling bars and extending transversely of and overlying said floats and said plates having their ends attached to said floats.

3. The device according to claim 2 which includes in addition a motor mounting bar extending transversely of and fixedly secured to said floats adjacent the rearward ends thereof.

References Cited in the file of this patent
UNITED STATES PATENTS

| | | |
|---|---|---|
| 1,093,475 | Rosing | Apr. 14, 1914 |
| 1,349,891 | Kuznetzoff | Aug. 17, 1920 |
| 1,452,790 | Claupin | Apr. 24, 1923 |
| 1,559,390 | Waller | Oct. 27, 1925 |
| 1,714,352 | Echola | May 21, 1929 |
| 2,119,775 | Chase | June 7, 1938 |
| 2,748,740 | Villar | June 5, 1956 |
| 2,828,491 | Turgeon | Apr. 1, 1958 |
| 2,929,348 | Jackson | Mar. 22, 1960 |
| 2,946,305 | Hill | July 26, 1960 |
| 3,063,071 | Van Vorst | Nov. 13, 1962 |

FOREIGN PATENTS

| | | |
|---|---|---|
| 800,650 | France | May 4, 1936 |
| 647,760 | Germany | July 12, 1937 |
| 807,596 | Germany | July 2, 1951 |
| 1,026,729 | France | Feb. 4, 1953 |
| 1,074,921 | France | Apr. 7, 1954 |